July 29, 1969     G. EGERTON-SMITH     3,458,163

CLEATS

Filed March 27, 1967     2 Sheets-Sheet 1

Inventor
GEORGE EGERTON-SMITH

July 29, 1969  G. EGERTON-SMITH  3,458,163
CLEATS

Filed March 27, 1967  2 Sheets-Sheet 2

Inventor
GEORGE EGERTON-SMITH
By Imrie & Smiley
Attorneys

United States Patent Office 3,458,163
Patented July 29, 1969

3,458,163
CLEATS
George Egerton-Smith, Chelmsford, England, assignor to Egerton Smith Engineers Limited, Gallywood End, Chelmsford, Essex, England, a corporation of Great Britain
Filed Mar. 27, 1967, Ser. No. 626,266
Claims priority, application Great Britain, Apr. 27, 1966, 18,447/66
Int. Cl. F16l 3/10, 3/22
U.S. Cl. 248—67.5                 4 Claims

ABSTRACT OF THE DISCLOSURE

A cleat for securing electric cables to supporting structures, the cleat comprising a body formed of two co-operating body portions and having means for securing the body portions together, the body having a bore which traverses the surfaces of separation of the body portions and a split insert for disposition in the bore, the insert having at least two parts, each part having a bore therethrough, the insert engaging inside the bore of the body when the two body parts are secured together.

BACKGROUND OF THE INVENTION

Hitherto electric cable have been secured to brackets, shelving, walls and like structures by securing devices in the form of clips having a stub secured to the structure as by bolts or screws passed therethrough and from which extend a pair of arms separated by a small space, e.g., 1/16 of an inch, the central portions of the arms having contiguous cut-away portions forming a channel through which the elongated member is passed: the arms can be forced towards each other by a screw or like means to cause the arms to apply a light hold on the elongated member.

Such known devices are made to suit individual sizes of cables or like members necessitating a large stock being kept by the fitters of all the sizes. Moreover where a number of members are mounted alongside one another, it is necessary to have a securing device for each member so that an expensive cluster of devices is necessary at each securing point which is costly in materials and labour costs.

The main object of the present invention is to provide a form of cleat for securing elongated members such as electric cables to supports, in which the aforesaid disadvantages are avoided.

SUMMARY

According to the present invention a cleat for securing elongated elements such as electric cables to supporting structures, comprises a body formed of two co-operating portions capable of being secured together, a bore in the body portion traversing the surface of separation of the body parts, a split insert disposable in the bore and having one or more parts with one or more bores therethrough each bore traversing the surface of separation between insert parts, and a shaped portion on the body and/or insert interengaging in the assembled parts to secure the insert on the body when the body parts are secured together.

The body bore and insert may be provided with one or more interengaging projections and recesses to secure the insert in the body bore.

The body may be provided with two or more bores, an insert being provided for each body bore. The bores on the inserts may be of different diameters or cross-sections. The projection is preferably in the form of an annular ring and the co-operating recess is an annular groove.

The body parts may be secured together by bolts or the like passing through bores in the body parts. The cleat body preferably has a rectangular external shape.

BRIEF DESCRIPTION OF THE DRAWINGS

In the drawings the same references are used to designate the same or similar parts.

DESCRIPTION OF THE PREFERRED EMBODIMENT

Figure 1:
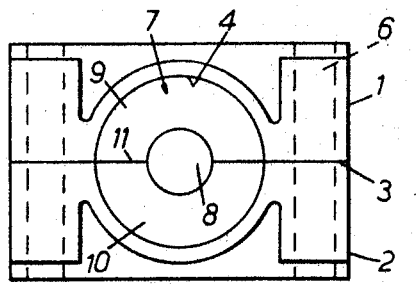
FIG. 1 is a side view of one form of cleat.

Referring to FIG. 1, the cleat is formed of top and bottom body parts 1, 2 separted by contacting surfaces at 3. The body has a bore 4, shown as central but which may be off centre, formed by part bores in each part 1, 2 traversing the surfaces 3. Through the side portions 5 of the body parts there are bores 6 through which means such as bolts or screws may be passed to secure the cleat to a structure such as a shelf or wall. Such bores 6 may be formed on one or both sides of the body.

Figure 3:
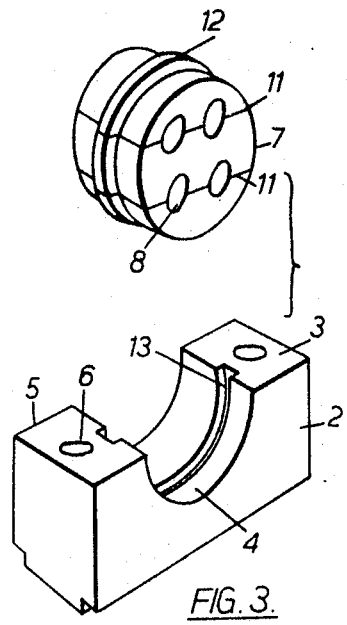
FIG. 3 is an exploded view of one-half of the body part and an insert.

Within the bore 4 is an insert 7 having an aperture 8 therethrough to receive the elongated member; the insert is formed in two parts 9, 10 joined by a surface of separation 11 traversing the aperture. The insert as seen in FIG. 3 has an annular projection 12 shaped to engage in an annular recess 13 in the wall of the bore 4 to hold the insert in the body bore. When the body parts 1, 2 are clamped together, the insert will be held against rotation in the bore 4, by reason of the size of the diameters of bore and insert.

Alternatively the projection can be merely one or more projections round the insert fitting into similarly shaped recesses in the bore 4; or the projections may be in the bore with the recess in the insert. In another form the bore may be non-circular and the insert similarly shaped to prevent its rotation or movement therein.

Figure 4:
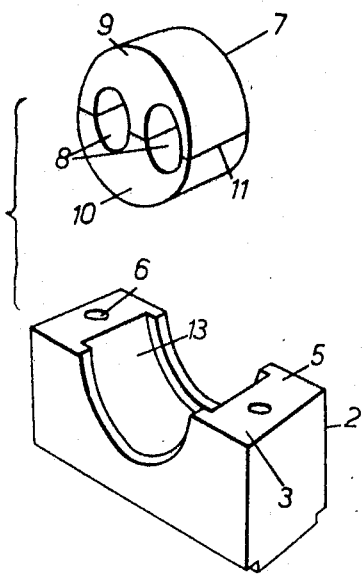
FIG. 4 is a view similar to FIG. 3 showing a modified construction.

As seen in FIG. 4 the insert has no projection and the recess in the insert is the width of the insert which fits singly thereinto.

Figure 2:
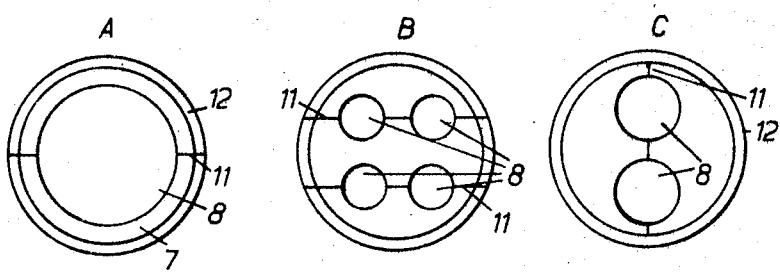
FIG. 2 shows three forms of inserts for different numbers of elongated members.

The insert is shown in FIGS. 1 and 2A as having a single hole, but as seen in FIG. 2C it may have two holes each traversing the surface of separation. Alternatively it may have two or more inserts in different places as seen in FIG. 2B in which case it is split by two or more surfaces of separation each traversing one or more holes.

I claim:
1. A cleat for securing elongated resilient elements such as electric cables to supporting structures, said cleat comprising a body formed of two cooperating body portions, means associated with said body for securing said body portions together at a surface of separation, said body having a bore therein which traverses the surface of separation of said body portions, a split insert of rigid material for disposition within said bore, said insert having at least two insert parts each having at least one bore therethrough, each of said insert bores traversing the surface of separation between adjacent insert parts, and an internal recess in the interior surface of the bore in said body and an external circumferential projection on said insert interengaging with the internal body recess in the assembled parts to secure said insert within said body when the said body portions are secured together.

2. A cleat according to claim 1, wherein said shaped portions of said insert and said body portions are in the form of interengaging at least part circumferential projections and recesses.

3. A cleat according to claim 1, wherein said insert is cylindrical and said projection is in the form of an annular ring on the insert and said recess is an annular groove in the bore of said body.

4. The cleat as defined in claim 1, wherein the parts of said rigid insert are urged into contact along their surfaces of separation simultaneously with and incidental to contact of said body portions at their surfaces of separation.

References Cited

UNITED STATES PATENTS

| | | | |
|---|---|---|---|
| 888,154 | 5/1908 | Friend | 174—155 |
| 2,338,660 | 1/1944 | Morehouse | 248—68 |
| 2,404,531 | 7/1946 | Robertson | 248—68 |
| 2,515,603 | 7/1950 | Kaplan | 174—155 |
| 2,963,539 | 12/1960 | Hynes | 248—68 X |

CHANCELLOR E. HARRIS, Primary Examiner

U.S. Cl. X.R.

248—68